(12) United States Patent
Kayano et al.

(10) Patent No.: US 7,186,763 B2
(45) Date of Patent: *Mar. 6, 2007

(54) MATERIAL FOR IMPARTING THIXOTROPY AND PASTY RESIN COMPOSITION

(75) Inventors: Yoshisada Kayano, Nara (JP); Isao Morioka, Kobe (JP); Kazuyuki Hosoi, Kawanishi (JP)

(73) Assignee: Shiraishi Kogyo Kaisha, Ltd., Osaka (JP)

( * ) Notice: Subject to any disclaimer, the term of this patent is extended or adjusted under 35 U.S.C. 154(b) by 95 days.

This patent is subject to a terminal disclaimer.

(21) Appl. No.: 10/497,458

(22) PCT Filed: Nov. 19, 2002

(86) PCT No.: PCT/JP02/12042

§ 371 (c)(1),
(2), (4) Date: Jun. 2, 2004

(87) PCT Pub. No.: WO03/048046

PCT Pub. Date: Jun. 12, 2003

(65) Prior Publication Data

US 2005/0004266 A1    Jan. 6, 2005

(30) Foreign Application Priority Data

Dec. 3, 2001 (JP) ............................. 2001-368360
Oct. 30, 2002 (JP) ............................. 2002-316062

(51) Int. Cl.
*B32B 5/16* (2006.01)
*B32B 9/00* (2006.01)
*C08J 3/00* (2006.01)
*C08K 9/00* (2006.01)
*C08L 31/00* (2006.01)

(52) U.S. Cl. .................. 523/205; 428/403; 428/407; 523/202; 523/210; 524/284; 524/300; 524/301; 524/322; 524/425; 524/556; 524/588; 524/589; 524/590; 524/609

(58) Field of Classification Search ................ 428/403, 428/407; 524/284, 300, 301, 322, 425, 556, 524/568, 588, 589, 590, 609; 523/202, 205, 523/210

See application file for complete search history.

(56) References Cited

U.S. PATENT DOCUMENTS 6,686,044 B2 * 2/2004 Nakai et al. ................ 428/403
2004/0092639 A1   5/2004 Kasahara et al. ........... 524/425

FOREIGN PATENT DOCUMENTS

| JP | 54-23648 | 2/1979 |
|---|---|---|
| JP | 54-133538 A | 10/1979 |
| JP | 60-231744 A | 11/1985 |
| JP | 3-80107 A | 4/1991 |
| JP | 4-6105 A | 1/1992 |
| JP | 4-31318 A | 2/1992 |
| JP | 04 006105 A | 4/1992 |
| JP | 4-249564 A | 9/1999 |
| JP | 11-349846 A | 12/1999 |
| JP | 2002-235015 A | 8/2002 |
| WO | 92/02587 A | 2/1992 |

* cited by examiner

*Primary Examiner*—Patrick D. Niland
(74) *Attorney, Agent, or Firm*—Kubovcik & Kubovcik

(57) ABSTRACT

Surface-treated calcium carbonate characterized by giving, upon analysis by the method of mercury penetration, a void diameter distribution curve which has a peak for the most probable void diameter at smaller than 0.03 μm and has a most probable void volume of 0.05 to 0.5 $cm^3/g$; and a pasty resin composition containing the surface-treated calcium carbonate. The calcium carbonate preferably comprises one obtained by surface-treating calcium carbonate having a BET specific surface area of 10 to 100 $m^2/g$ with an unsaturated fatty acid (A) and a saturated fatty acid (B).

12 Claims, No Drawings

MATERIAL FOR IMPARTING THIXOTROPY AND PASTY RESIN COMPOSITION

TECHNICAL FIELD

The present invention relates to a material for imparting thixotropy comprised of surface-treated calcium carbonate and more specifically to a material for imparting thixotropy useful for addition to various polymer materials such as inks, paints, sealants, polyvinyl chloride sols (PVC sols) and acrylic sols. The present invention also relates to a paste resin composition containing the surface-treated calcium carbonate and more specifically to a paste resin composition useful as a polyurethane sealant, modified silicone sealant, silicone sealant, polysulfide sealant, polyvinyl chloride sol, acrylic sol or the like.

BACKGROUND ART

Inks, paints, sealants, PVC sols, acrylic sols and the like are generally prepared in the form of a sol which is convenient for practice of painting, coating, applying, mixing or the like operation. In cases where the required physical properties or qualities of a cured end product hinder high loading of a filler in the sol, fumed silica or the like filler has been conventionally used which, even in a small amount, can impart an increased viscosity to the sol.

However, because fumed silica is generally high in cost, a need has arisen for a substitute material for imparting thixotropy which is less expensive but yet can impart a high degree of viscosity. Calcium carbonate has been used in a wide variety of fields, for example, as a filler for plastics, rubbers, inks, paints, sealants, PVC sols, acrylic sols and the like. Accordingly, calcium carbonate will be useful as a relatively inexpensive material for imparting thixotropy, if it when added could impart high degrees of viscosity and thixotropy.

DISCLOSURE OF THE INVENTION

A first object of the present invention is to provide a material for imparting thixotropy which comprises surface-treated calcium carbonate, which can impart a high degree of viscosity and a satisfactory degree of thixotropy and which insures good storage stability.

A second object of the present invention is to provide a paste resin composition containing surface-treated calcium carbonate which can impart a high degree of viscosity and a satisfactory degree of thixotropy.

The invention provides a material for imparting thixotropy comprised of surface-treated calcium carbonate. Characteristically, the material for imparting thixotropy exhibits a modal pore size peak at below 0.03 μm and a modal pore volume of 0.05–0.5 cm$^3$/g on a pore size distribution curve derived from mercury porosimetry.

Because the material for imparting thixotropy of the present invention comprises surface-treated calcium carbonate, it can be produced at a relatively low price. Also because the material for imparting thixotropy exhibits a modal pore size peak at below 0.03 μm and a modal pore volume of 0.05–0.5 cm$^3$/g on a pore size distribution curve derived from mercury porosimetry, it shows superior dispersibility in polymeric materials and can impart a high degree of viscosity and a satisfactory degree of thixotropy to the polymeric materials. Also, polymeric materials containing the material for imparting thixotropy of the present invention show good storage stability.

Preferably, the surface-treated calcium carbonate in the present invention is the one that results from surface treatment of calcium carbonate with an unsaturated fatty acid (A) and a saturated fatty acid (B). Also preferably, the calcium carbonate to be subjected to the surface treatment has a BET specific surface area of 10–100 m$^2$/g.

The unsaturated fatty acid (A) and saturated fatty acid (B) may be used in the acid form, or alternatively in the form of a metal salt or ester, to effect the surface treatment. Each of the unsaturated fatty acid (A) and saturated fatty acid (B) preferably has a carbon cumber of 6–31. Also, the unsaturated fatty acid (A) and saturated fatty acid (B) are preferably blended in the (A)/(B) ratio of 0.3–5.

A total amount of the unsaturated fatty acid (A) and saturated fatty acid (B) used to effect the surface treatment is preferably 1–50 parts by weight, based on 100 parts by weight of the calcium carbonate.

If the total amount of the unsaturated fatty acid (A) and saturated fatty acid (B) used to effect the surface treatment is denoted by (C) parts by weight and the BET specific surface area of the calcium carbonate by (D) m$^2$/g, the (C)/(D) ratio is preferably 0.1–0.5.

The surface-treated calcium carbonate preferably has a moisture content of 0.05–1.0%, when measured using a Karl Fischer moisture meter.

The paste resin composition of the present invention is characterized as containing surface-treated calcium carbonate which exhibits a modal pore size peak at below 0.03 μm and a modal pore volume of 0.05–0.5 cm$^3$/g on a pore size distribution curve derived from mercury porosimetry.

Because the paste resin composition of the present invention contains such surface-treated calcium carbonate, it can be produced at a relatively low cost. The surface-treated calcium carbonate, because of its modal pore size peak at below 0.03 μm and its modal pore volume of 0.05–0.5 cm$^3$/g on a pore size distribution curve derived from mercury porosimetry, shows superior dispersibility in the paste resin composition which accordingly results in enjoying a high degree of viscosity and satisfactory thixotropic properties. Also, the paste resin composition of the present invention exhibits good storage stability.

The paste resin composition of the present invention can be used as a sealant. Sealant is mostly used in joint portions, crack portions and air-gap glazing fitting portions of building, housing and other architectural constructions to keep out air and moisture.

Examples of sealants include polyurethane, modified silicone, silicone and polysulfide sealants. These sealants are classified into two types, i.e., one-part and two-part sealants, by their curing mechanisms.

The paste resin composition of the present invention may be in the form of a polyvinyl chloride sol or an acrylic sol. Polyvinyl chloride sol is mostly used as a noise insulation material at automobile tire surroundings or vehicle bottoms and as a cushioning material at opening and closing portions of doors and trunks.

Acrylic sol is also used as a noise insulation material at automobile tire surroundings or vehicle bottoms and as a cushioning material at opening and closing portions of doors and trunks.

The present invention is below described in more detail.

(Calcium Carbonate Particles)

In the present invention, the calcium carbonate in the form of particles for use as a subject of surface treatment is not particularly limited in type, so long as it is useful as a filler for various polymeric material. Examples of calcium carbonates include natural calcium carbonate (heavy calcium carbonate) and synthetic calcium carbonate (precipitated (colloidal) calcium carbonate). Natural calcium carbonate is produced directly from limestone ore and can be produced, for example, by subjecting limestone ore to a sequence of mechanical pulverization and classification.

Synthetic calcium carbonate is produced from calcium hydroxide and can be produced, for example, by allowing calcium hydroxide to react with a carbon dioxide gas. Calcium hydroxide can be produced, for example, by allowing calcium oxide to react with water. Calcium oxide can be produced, for example, by subjecting limestone ore, in combination with coke or the like, to calcination. In this case, a carbon dioxide gas is generated during the calcination. Accordingly, calcium carbonate can be produced by allowing the generated carbon dioxide gas to react with calcium hydroxide.

The calcium carbonate for use in the present invention preferably has a BET specific surface area of 10–100 $m^2/g$. The surface treatment of calcium carbonate, if its BET specific surface area is below 10 $m^2/g$, may result in the difficulty to obtain surface-treated calcium carbonate which exhibits a modal pore size peak and a modal pore volume within the range specified in the present invention upon examination of a pore size distribution curve derived from mercury porosimetry. It is generally difficult to produce calcium carbonate having a BET specific surface area of greater than 100 $m^2/g$. The BET specific surface area of calcium carbonate is more preferably 20–80 $m^2/g$, still more preferably 30–60 $m^2/g$.

(Unsaturated Fatty Acid)

In the present invention, it is preferred that the calcium carbonate is surface-treated with both the unsaturated fatty acid (A) and the saturated fatty acid (B) The unsaturated fatty acid refers to a fatty acid containing a double bond in a molecule and can be synthesized, for example, by dehydration of a saturated fatty acid within a living body. The unsaturated fatty acid preferably has a carbon number of 6–31, more preferably 8–26, still more preferably 9–21. Specific examples of unsaturated fatty acids include obtusilic acid, caproleic acid, undecyleic acid, linderic acid, tsuzuic acid, physeteric acid, myristoleic acid, palmitoleic acid, petroslic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, sorbic acid and linoleic acid. Particularly preferred among them are oleic acid, erucic acid and linoleic acid.

In the surface treatment, the unsaturated fatty acid may be used in the original acid form, or alternatively, in its metal salt and/or ester form. Examples of metal salts include alkaline metal salts and alkaline earth metal salts of unsaturated fatty acids. The use of water-soluble metal salts, among them, is preferred. Specific examples of metal salts of unsaturated fatty acid include sodium, potassium and magnesium salts of the above-listed unsaturated fatty acids. Sodium oleate, sodium erucate and sodium linoleate are particularly useful.

Examples of esters are those of unsaturated fatty acids with lower aliphatic alcohols, including methyl esters, ethyl esters, propyl esters, isopropyl esters, butyl esters, sec-butyl esters and tert-butyl esters of unsaturated fatty acids.

The above-listed unsaturated fatty acids, metal salts and esters may be used alone or in combination.

(Saturated Fatty Acid)

The saturated fatty acid (B) is a fatty acid which has no double bond in a molecule. Natural fatty acids are mostly linear monobasic acids. The saturated fatty acid preferably has a carbon number of 6–31, more preferably 8–26, still more preferably 9–21. Specific examples of saturated fatty acids include butyric acid, caproic acid, caprylic acid, pelargonic acid, capric acid, undecanoic acid, lauric acid, myristic acid, palmitic acid, stearic acid, arachic acid, behenic acid, lignoceric acid, cerotic acid, montanic acid and melissic acid. The use of palmitic acid, stearic acid and lauric acid, among them, is preferred.

In the surface treatment, the saturated fatty acid may be used in its original acid form, or alternatively, in its metal salt and/or ester form. Examples of metal salts include alkaline metal salts and alkaline earth metal salts of saturated fatty acids. The use of water-soluble metal salts, among them, is preferred. Specific examples of metal salts of saturated fatty acid include sodium, potassium and magnesium salts of the above-listed saturated fatty acids. Sodium palmitate, sodium stearate and sodium laurate are particularly useful.

Examples of esters are those of saturated fatty acids with lower aliphatic alcohols, including methyl esters, ethyl esters, propyl esters, isopropyl esters, butyl esters, sec-butyl esters and tert-butyl esters of saturated fatty acids.

The above-listed saturated fatty acids, metal salts and esters may be used alone or in combination.

(Surface-treated Calcium Carbonate)

Surface-treated calcium carbonate is calcium carbonate having additional property imparted as a result of surface treatment thereof. Examples of treatment agents include, but not limited to, fatty acids such as (A) and (B); resin acids such as abietic acid, dehydroabietic acid and dihydroabietic acid; silane coupling agents such as vinylsilane, aminosilane and mercaptosilane; resins such as polyethylene, polypropylene and urethane resins; and polymeric dispersants. The use of saturated fatty acids and unsaturated fatty acids is preferred in the present invention.

The surface-treated calcium carbonate of the present invention exhibits a modal pore size peak at below 0.03 μm and a modal pore volume of 0.05–0.5 $cm^3/g$ on a pore size distribution curve derived from mercury porosimetry. Fine particles of calcium carbonate readily form agglomerates which vary in size and number depending upon the surface treatment technique used. The modal pore size peak and modal pore volume vary in value with the sizes and number of such agglomerates. The surface treatment, when performed such that a modal pore size peak and a modal pore volume fall within the respective ranges specified in the present invention, results in the provision of the material for imparting thixotropy capable of imparting high viscosity and a satisfactory degree of thixotropy. A lower limit of the modal pore size peak is not particularly specified. However, it is generally hard to produce surface-treated calcium carbonate which exhibits a modal pore size peak at below 0.002 μm. Accordingly, the modal pore size peak is more preferably below 0.03 μm but not below 0.002 μm, still more preferably in the range of 0.005–0.02 μm. The modal pore volume is more preferably in the range of 0.1–0.3 $cm^3/g$.

The pore size and pore volume of the surface-treated calcium carbonate can be measured, for example, by using a mercury intrusion porosimeter (POROSIMETER 2000, product of Carlo Erba Instruments., Inc.). For example, measurement can be carried out under the conditions of a maximum intrusion pressure of 160 MPa·s and a threshold pore size of 0.002 μm. The pore volume can be determined by a volume of mercury forced into pores of calcium carbonate particles. The pore size can be determined by an intrusion pressure which forced the mercury into pores of calcium carbonate particles and a surface tension of the mercury. A median value of a modal pore size peak on a pore size distribution curve is taken as the modal pore size. Then, the modal pore volume can be determined as a pore volume included in this peak.

As stated above, the surface-treated calcium carbonate of the present invention preferably results from the surface treatment of calcium carbonate with the unsaturated fatty acid (A) and saturated fatty acid (B). In this case, the unsaturated fatty acid (A) and saturated fatty acid (B) are preferably blended in the (A)/(B) ratio of 0.3–5. The surface treatment, if performed using a combination of the unsaturated fatty acid (A) and saturated fatty acid (B) at the specified ratio, assures provision of the effect of the present invention that imparts a high degree of viscosity and a satisfactory degree of thixotropy. The (A)/(B) ratio is more preferably 0.7–4, still more preferably 1–2. The total amount of the unsaturated fatty acid (A) and saturated fatty acid (B) used to effect the surface treatment is preferably 1–50 parts by weight, based on 100 parts by weight of the calcium carbonate. The use of such fatty acids in the surface treatment, if in the total amount within the specified range, assures provision of the effect of the present invention that imparts a high degree of viscosity and a satisfactory degree of thixotropy. The total amount of such fatty acids used to effect the surface treatment is more preferably 3–30 parts by weight, still more preferably 6–20 parts by weight, based on 100 parts by weight of the calcium carbonate.

If the total amount of the unsaturated fatty acid (A) and saturated fatty acid (B) used to effect the surface treatment is denoted by (C) parts by weight and the BET specific surface area of calcium carbonate by (D) m$^2$/g, the (C)/(D) ratio is preferably 0.1–0.5, more preferably 0.15–0.45, still more preferably 0.2–0.4. The paste resin composition, if using calcium carbonate with its surface being treated with the fatty acids in the specified total amount, assures provision of the effect of the present invention that imparts a high degree of viscosity and a satisfactory degree of thixotropy.

A composition of the surface treatment agent in the surface-treated calcium carbonate can be determined as by a gas chromatography. The amount of the surface treatment agent contained therein can be determined as by differential thermal analysis.

The drying process in the production, if carried out to reduce a moisture content to a low level, increases a cost. On the other hand, if it is carried out to leave a moisture content at an excessively high level, a problem such as poor storage stability arises when it is formulated into the paste resin composition. It is therefore desirable that the surface-treated calcium carbonate is maintained at a proper moisture content level, preferably in the range of 0.05–1.0%, more preferably 0.1–0.9%, still more preferably 0.2–0.8%, when measured by a Karl Fischer moisture content meter. The use of the surface-treated calcium carbonate having a moisture content within the specified range results in imparting good storage stability.

(Production of Surface-treated Calcium Carbonate)

Surface-treated calcium carbonate is calcium carbonate having additional property imparted as a result of surface treatment thereof. Examples of treatment agents include, but not limited to, fatty acids such as (A) and (B); resin acids such as abietic acid, dehydroabietic acid and dihydroabietic acid; silane coupling agents such as vinylsilane, aminosilane and mercaptosilane; resins such as polyethylene, polypropylene and urethane resins; and polymeric dispersants. The use of saturated fatty acids and unsaturated fatty acids is preferred in the present invention.

The surface-treated calcium carbonate can be produced, for example, by adding a surface treatment agent to an aqueous slurry of calcium carbonate particles, stirring and then dewatering the slurry. Where the unsaturated fatty acid (A) and saturated fatty acid (B) are used, they may be added in the form of a mixture. The calcium carbonate solids content in the aqueous slurry may be suitably adjusted, e.g., depending on the dispersibility of the calcium carbonate particles, ease of dewatering and sizes of the calcium carbonate particles. The aqueous slurry shows a proper degree of viscosity when its solids content is adjusted generally to 2–30 weight %, preferably 5–20 weight %. Use of an excessively large quantity of water is disadvantageous because it makes dewatering difficult and increases a drainage load.

The unsaturated fatty acid (A) and saturated fatty acid (B) while in the acid form are generally difficult to disperse quickly in the aqueous slurry. Accordingly, it is generally preferred that they are saponified to form sodium or potassium salts for addition to the aqueous slurry of calcium carbonate.

According to another method for production of the surface-treated calcium carbonate, dried calcium carbonate particles are stirred in a stirring and mixing machine, such as a Henschel mixer, to which a surface treatment agent is added. This method becomes advantageous when calcium carbonate has a relatively large particle size.

(Polymeric Material)

The surface-treated calcium carbonate of the present invention, when loaded as a filler in polymeric materials such as inks, paints, sealants, PVC sols and acrylic sols, can impart a high degree of viscosity and a satisfactory degree of thixotropy thereto, as well as insuring good storage stability. The amount of the surface-treated calcium carbonate to be loaded in polymeric materials is suitably chosen depending on the loading purpose, characteristic properties sought for such polymeric materials and the others.

For example, the surface-treated calcium carbonate can be made into an ink formulation in the general amount of about 5–100 parts by weight, based on 100 parts by weight of an ink resin component; a paint formulation in the general amount of about 5–100 parts by weight, based on 100 parts by weight of a paint resin component; a sealing medium formulation, e.g., a silicone resin sealing medium in the general amount of about 5–400 parts by weight, based on 100 parts by weight of a sealing medium resin component; a PVC sol formulation in the general amount of about 5–400 parts by weight, based on 100 parts by weight of a PVC sol resin component; or an acrylic sol formulation in the general amount of about 5–400 parts by weight, based on 100 parts by weight of an acrylic sol resin component.

(Polyurethane Sealant)

The paste resin composition of the present invention may be formulated to constitute a polyurethane sealant which mainly contains isocyanate, polyol, plasticizer, filler and other additives.

Examples of isocyanates include tolylene diisocyanate (TDI), 4, 4-diphenylmethane diisocyanate (MDI), 1,5-naphthalene diisocyanate, tolidine diisocyanate (TODI), xylene diisocyanate, hexamethylene diisocyanate and modified products thereof; dicyclohexylmethane diisocyanate (hydrogenated MDI); isophorone diisocyanate (IPDI); and the like.

Examples of polyols include dicarboxylic acids such as adipic acid, phthalic acid, sebacic acid and dimer acid; glycols such as ethylene glycol, diethylene glycol, propylene glycol, butylene glycol, 1,3-butanediol, hexanetriol and trimethylol-propane; and the like. Other polyols include esters of the type formed via ring-opening polymerization of caprolactone.

Examples of plasticizers include dimethyl phthalate (DMP), diethyl phthalate (DEP), di-n-butyl phthalate (DBP), diheptyl phthalate (DHP), dioctyl phthalate (DOP), diisononyl phthalate (DINP), diisodecyl phthalate (DIDP), di-tridecyl phthalate (DTDP), butyl benzyl phthalate (BBP), dicyclohexyl phthalate (DCHP), tetrahydrophthalate ester, dioctyl adipate (DOA), diisononyl adipate (DINA), diisodecyl adipate (DIDA), di-n-alkyl adipate, dibutyl diglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl) phosphate (TOP), tris (chloroethyl) phosphate (TCEP), tris (dichloropropyl) phosphate (CRP), tributoxyethyl phosphate (TBXP), tris($\beta$-chloropropyl) phosphate (TMCPP), triphenyl phosphate (TPP), octyl diphenyl phosphate (CDP), acetyl triethyl citrate, acetyl tributyl citrate and the like. Others include trimellitic acid plasticizers, polyester plasticizers, chlorinated paraffin, stearic acid plasticizers and dimethyl polysiloxane.

Examples of fillers (including thickeners) include organic and inorganic fillers. Examples of inorganic fillers include calcium carbonate (natural and synthetic products), calcium-magnesium carbonate (natural and synthetic products), basic magnesium carbonate, quartz powder, silica stone powder, fine particle silicic acid (products obtained by dry, wet and gel processes), fine particle calcium silicate, fine particle aluminum silicate, kaolin clay, pyrophyllite clay, talc, sericite, mica, bentonite, nepheline syenite, aluminum hydroxide, magnesium hydroxide, barium sulfate, carbon black (furnace, thermal and acetylene), graphite and the like. Examples of needle-like and fibrous inorganic fillers include sepiolite, wollastonite, xonotlite, potassium titanate, carbon fibers, mineral fibers, glass fibers, shirasu balloons, fly ash balloons, glass balloons, silica beads, alumina beads, glass beads and the like. Examples of powder- and bead-form organic fillers include wood powder, walnut powder, cork powder, flour, starch, ebonite powder, rubber powder, lignin, phenolic resins, high styrene resins, polyethylene resins, silicone resins, urea resins, and the like. Examples of fibrous organic fillers include cellulose powder, pulp powder, synthetic fiber powder, amide wax, castor oil wax, and the like.

The surface-treated calcium carbonate is preferably loaded in the paste resin composition of the present invention in the amount of 5–400 parts by weight, more preferably 10–300 parts by weight, based on 100 parts by weigh of all of resin components (including a plasticizer) and liquid additives.

In the case where the paste resin composition constitutes a polyurethane sealant, the surface-treated calcium carbonate is preferably loaded therein in the above-specified amount, based on 100 parts by weight of all of the isocyanate, polyol, plasticizer and liquid additives.

(Modified Silicone Sealant)

The paste resin composition of the present invention may be formulated to constitute a modified silicone sealant which primarily contains a modified silicone resin, a plasticizer, a filler and other additives.

One useful modified silicone resin can be produced, for example, by converting a terminal hydroxyl group of polyoxy propylene glycol to an alkoxide group, subjecting to a reaction with a polyhalogen compound to increase a molecular weight, subjecting to a chain extending reaction to further increase a molecular weight, subjecting to a reaction with an organic halogen compound represented by $CH_2=CHRX$ to introduce an olefinic group at a terminal end, subjecting to a dehalogenation purification process, and subjecting to hydrosilylation to introduce a reactive silicone functional group at a terminal end.

Examples of useful plasticizers, fillers and other additives are listed above as applicable to the polyurethane sealant.

In the case where the paste resin composition constitutes a modified silicone sealant, the surface-treated calcium carbonate is preferably loaded therein in the amount of 5–400 parts by weight, more preferably 10–300 parts by weight, based on 100 parts by weight of all of the modified silicone resin, plasticizer and liquid additives.

(Silicone Sealant)

The paste resin composition of the present invention may be formulated to constitute a silicone sealant which primarily contains a silicone resin, a crosslinking agent, a plasticizer, a filler and other additives.

One useful silicone resin can be produced as follows. Silicon dioxide is reduced in an electric furnace to obtain metallic silicon (Si) which is subsequently ground. The ground metallic silicon is reacted with methyl chloride ($CH_3Cl$) at a high temperature in the presence of a copper catalyst to synthesize crude chlorosilane ($(CH_3)_nSiCl_{4-n}$) which is then rectified to collect dimethyldichlorosilane ($(CH_3)_2SiCl_2$). The dimethyldichlorosilane condenses upon hydrolysis into a cyclic structure and a hydroxyl-containing linear structure. Polymerization of such a structure, either cyclic or linear, in the presence of $H_2O$ and an alkaline or acid catalyst results in provision of a silicone resin having hydroxyl group at each terminal end.

Useful crosslinking agents are silane or siloxane compounds containing at least two hydrolyzable functional groups. Examples include those of deoximation type, deacetic acid type, dealcoholation type, deamidation type and dehydroxylamination type; ground organopolysiloxane; and the like.

Examples of useful plasticizers, fillers and other additives are listed above as applicable to the polyurethane sealant.

In the case where the paste resin composition constitutes a silicone sealant, the surface-treated calcium carbonate is preferably loaded therein in the amount of 5–400 parts by weight, more preferably 10–300 parts by weight, based on 100 parts by weight of all of the silicone resin, crosslinking agent, plasticizer and liquid additives.

(Polysulfide Sealant)

The paste resin composition of the present invention may be formulated to constitute a polysulfide sealant which primarily contains a polysulfide resin, a plasticizer, a filler and other additives.

One useful polysulfide resin can be produced as follows. Ethylene oxide and hydrochloric acid are reacted to produce ethylene chlorohydrin which is subsequently reacted with paraformaldehyde to obtain dichloroethylformal as a starting material. The thus-obtained dichloroformal is added with stirring and heating to a colloidal suspension containing sodium polysulfide, a small amount of activator and magnesium hydroxide to produce the polysulfide resin.

It is a recent trend to use a modified polysulfide resin having an SH group (mercapto group) at its molecular end and a urethane bond in its main chain.

Examples of useful plasticizers, fillers and other additives are listed above as applicable to the polyurethane sealant.

In the case where the paste resin composition constitutes a polysulfide sealant, the surface-treated calcium carbonate is preferably loaded therein in the amount of 5–400 parts by weight, more preferably 10–300 parts by weight, based on 100 parts by weight of all of the polysulfide resin (modified polysulfide resin), plasticizer and liquid additives.

(Vinyl Chloride Sol)

The paste resin composition of the present invention may be formulated to constitute a vinyl chloride sol which primarily contains a vinyl chloride resin, a plasticizer, a filler and other additives. Examples of useful plasticizers, fillers and other additives are listed above as applicable to the polyurethane sealant.

In the case where the paste resin composition constitutes a vinyl chloride sol, the surface-treated calcium carbonate is preferably loaded therein in the amount of 5–400 parts by weight, more preferably 10–300 parts by weight, based on 100 parts by weight of all of the vinyl chloride resin, plasticizer and liquid additives.

(Acrylic Sol)

The paste resin composition of the present invention may be formulated to constitute an acrylic sol which primarily contains an acrylic resin, a crosslinking agent, a plasticizer, a filler and other additives.

Examples of monomers useful for constituting the acrylic resin are methacrylic monomers which can be roughly classified into nonfunctional, monofunctional and polyfunctional ones. Examples of nonfunctional monomers include methyl methacrylate, ethyl methacrylate, propyl methacrylate, butyl methacrylate, isobutyl methacrylate, tert-butyl methacrylate, 2-ethylhexyl methacrylate, octyl methacrylate, isodecyl methacrylate, lauryl methacrylate, lauryl-tridecyl methacrylate, tridecyl methacrylate, cetyl-stearyl methacrylate, stearyl meth-acrylate, cyclohexyl methacrylate, benzyl methacrylate and the like. Examples of monon-functional monomers include methacrylic acid, 2-hydroxy-ethyl methacrylate, 2-hydroxy-propyl methacrylate, dimethylaminoethyl methacrylate, di-ethylaminoethyl methacrylate, tert-butylaminoethyl meth-acrylate, glycidyl methacrylate, tetrahydrofurfuryl meth-acrylate and the like. Examples of polyfunctional monomers include ethylene di-methacrylate, diethylene glycol di-methacrylate, triethylene glycol dimethacrylate, tetra-ethylene glycol dimethacrylate, decaethylene glycol di-methacrylate, pentadecaethylene glycol dimethacrylate, pentacontahectaethylene glycol dimeth-acrylate, 1,3-butylene dimethacrylate, allyl meth-acrylate, trimethylolpropane tri-methacrylate, pentaerythritol tetramethacrylate, phthalic acid ethylene glycol dimethacrylate and the like. The acrylic resin can be produced by copolymerization of the above-listed nonfunctional monomers with the above-listed monofunctional monomers and/or polyfunctional monomers.

Examples of crosslinking agents include amino resins, isocyanate compounds, epoxy resins and the like. Examples of useful plasticizers and fillers are listed above as applicable to the polyurethane sealant.

In the case where the paste resin composition constitutes an acrylic sol, the surface-treated calcium carbonate is preferably loaded therein in the amount of 5–400 parts by weight, more preferably 10–300 parts by weight, based on 100 parts by weight of all of the acrylic resin, plasticizer and liquid additives.

BEST MODE FOR CARRYING OUT THE PRESENT INVENTION

The present invention is below described in more detail by way of Examples. It will be recognized that the present invention is not limited to the following examples. Suitable changes and modifications can be effected without departing from the scope of the present invention.

(Preparation of Surface-treated Calcium Carbonate)

EXAMPLE 1

Water controlled at 80° C. was added to 2 kg of synthetic calcium carbonate having a BET specific surface area of 40 $m^2/g$ such that a solids content by weight was brought to 10%. The mixture was stirred in a media stirring disperser to prepare an aqueous slurry of calcium carbonate. 200 g of mixed fatty acid (containing 100 g oleic acid and 100 g stearic acid), with a saponified oleic acid/stearic acid ratio=1.0, was added to the aqueous slurry while stirred in the disperser. After 5 minutes of stirring, the aqueous slurry was dewatered by pressing. The dewatered cake was dried and finely divided to obtain about 2 kg of surface-treated calcium carbonate as a result of surface treatment of the calcium carbonate with the unsaturated fatty acid and saturated fatty acid.

The BET specific surface area was measured using a specific surface area measurement apparatus FlowSorb II 2300 (product of Micromeritics Corp.).

EXAMPLE 2

The procedure of Example 1 was followed, except that synthetic calcium carbonate having a BET specific surface area of 25 $m^2/g$ was used, to produce surface-treated calcium carbonate as a result of surface treatment of the calcium carbonate with the unsaturated fatty acid and saturated fatty acid.

EXAMPLE 3

200 g of mixed fatty acid (containing 67 g oleic acid and 133 g stearic acid) at the oleic acid/stearic acid ratio=0.5 was used. Otherwise, the procedure of Example 1 was followed to produce surface-treated calcium carbonate as a result of surface treatment of the calcium carbonate with the unsaturated fatty acid and saturated fatty acid.

EXAMPLE 4

200 g of mixed fatty acid (containing 130 g oleic acid and 70 g stearic acid) at the oleic acid/stearic acid ratio=1.9 was used. Otherwise, the procedure of Example 1 was followed to produce surface-treated calcium carbonate as a result of surface treatment of the calcium carbonate with the unsaturated fatty acid and saturated fatty acid.

EXAMPLE 5

200 g of mixed fatty acid (containing 100 g oleic acid and 100 g palmitic acid) at the oleic acid/palmitic acid ratio=1.0 was used. Otherwise, the procedure of Example 1 was followed to produce surface-treated calcium carbonate as a result of surface treatment of the calcium carbonate with the unsaturated fatty acid and saturated fatty acid.

EXAMPLE 6

200 g of mixed fatty acid (containing 100 g oleic acid, 50 g stearic acid and 50 g palmitic acid) at the oleic acid/(stearic acid+palmitic acid) ratio=1.0 was used. Otherwise, the procedure of Example 1 was followed to produce surface-treated calcium carbonate as a result of surface treatment of the calcium carbonate with the unsaturated fatty acid and saturated fatty acid.

EXAMPLE 7

200 g of mixed fatty acid (containing 100 g oleic acid, 50 g stearic acid and 50 g lauric acid) at the oleic acid/(stearic acid+lauric acid) ratio=1.0 was used. Otherwise, the procedure of Example 1 was followed to produce surface-treated calcium carbonate as a result of surface treatment of the calcium carbonate with the unsaturated fatty acid and saturated fatty acid.

EXAMPLE 8

200 g of mixed fatty acid (containing 100 g oleic acid, 34 g stearic acid, 33 g palmitic acid and 33 g lauric acid) at the oleic acid/(stearic acid+palmitic acid+lauric acid) ratio=1.0 was used. Otherwise, the procedure of Example 1 was followed to produce surface-treated calcium carbonate as a result of surface treatment of the calcium carbonate with the unsaturated fatty acid and saturated fatty acid.

EXAMPLE 9

200 g of mixed fatty acid (containing 80 g oleic acid, 20 g linoleic acid, 34 g stearic acid, 33 g palmitic acid and 33 g lauric acid) at the (oleic acid+linoleic acid)/(stearic acid+palmitic acid+lauric acid) ratio=1.0 was used. Otherwise, the procedure of Example 1 was followed to produce surface-treated calcium carbonate as a result of surface treatment of the calcium carbonate with the unsaturated fatty acid and saturated fatty acid.

COMPARATIVE EXAMPLE 1

The procedure of Example 1 was followed, except that 2 kg of synthetic calcium carbonate having a BET specific surface area of 15 $m^2/g$ was used, to produce surface-treated calcium carbonate as a result of surface treatment of the calcium carbonate with the unsaturated fatty acid and saturated fatty acid.

COMPARATIVE EXAMPLE 2

60 g of mixed fatty acid (containing 30 g oleic acid and 30 g stearic acid) at the oleic acid/stearic acid ratio=1.0 was used. Otherwise, the procedure of Example 1 was followed to produce surface-treated calcium carbonate as a result of surface treatment of the calcium carbonate with the unsaturated fatty acid and saturated fatty acid.

COMPARATIVE EXAMPLE 3

The procedure of Example 1 was followed, except that the oleic acid/stearic acid ratio=0 was chosen, i.e., oleic acid was excluded and only stearic acid was used in the amount of 200 g, to produce surface-treated calcium carbonate as a result of surface treatment of the calcium carbonate with the unsaturated fatty acid and saturated fatty acid.

(Powder Test)

The surface-treated calcium carbonates obtained in Examples 1–9 and Comparative Examples 1–3 were measured for modal pore size and modal pore volume, using a mercury intrusion porosimeter under the conditions of a maximum intrusion pressure of 160 MPa·s and a threshold pore size of 0.002 μm Also, a total amount of the unsaturated fatty acid and saturated fatty acid that effected the surface treatment was measured by differential thermal analysis. An unsaturated fatty acid/saturated fatty acid ratio was also measured for each surface-treated calcium carbonate, using gas chromatography. The results are shown in Table 1.

Also, a value for (C)/(D) is shown in Table 1, when the total amount of the unsaturated fatty acid and saturated fatty acid used in the surface treatment is given by (C) parts by weight and the BET specific surface area of each calcium carbonate by (D) $m^2/g$.

A moisture content of each surface-treated calcium carbonate is also shown in Table 1, when measured with a Karl Fisher moisture meter.

TABLE 1

| | Ex. 1 | Ex. 2 | Ex. 3 | Ex. 4 | Ex. 5 | Ex. 6 |
|---|---|---|---|---|---|---|
| Pore Size Distribution | | | | | | |
| Modal Pore Size(μm) | 0.016 | 0.028 | 0.026 | 0.018 | 0.016 | 0.016 |
| Modal Pore Volume($cm^3/g$) | 0.20 | 0.23 | 0.15 | 0.21 | 0.20 | 0.19 |
| Amount of Fatty Acids (parts by weight) | 10.1 | 9.5 | 9.8 | 9.9 | 10.0 | 9.9 |
| Unsaturated/Saturated Fatty Acid | 1.1 | 1.0 | 0.5 | 1.9 | 1.0 | 1.0 |
| (C)/(D) | 0.30 | 0.40 | 0.31 | 0.29 | 0.31 | 0.28 |
| Karl Fischer Moisture Content (%) | 0.51 | 0.50 | 0.52 | 0.48 | 0.47 | 0.55 |

| | Ex. 7 | Ex. 8 | Ex. 9 | Comp. Ex. 1 | Comp. Ex. 2 | Comp. Ex. 3 |
|---|---|---|---|---|---|---|
| Pore Size Distribution | | | | | | |
| Modal Pore Size(μm) | 0.018 | 0.020 | 0.016 | 0.066 | 0.050 | 0.088 |
| Modal Pore Volume($cm^3/g$) | 0.21 | 0.20 | 0.21 | 0.22 | 0.19 | 0.10 |
| Amount of Fatty Acids (P.B.W.) | 9.5 | 9.6 | 9.8 | 9.9 | 3.1 | 10.0 |
| Unsaturated/Saturated Fatty Acid | 1.1 | 1.0 | 1.0 | 1.0 | 1.1 | 0 |
| (C)/(D) | 0.26 | 0.27 | 0.29 | 0.71 | 0.09 | 0.32 |
| Karl Fischer Moisture Content (%) | 0.58 | 0.56 | 0.53 | 0.35 | 0.12 | 0.78 |

(DOP Sol Viscosity Test)

Each of the surface-treated calcium carbonates obtained in Examples 1–9 and Comparative Examples 1–3 was formulated into a DOP sol and its viscosity was subsequently measured. 200 g of the surface-treated calcium carbonate and 200 g of DOP (dioctyl phthalate, product of J-Plus Co., Ltd.) were fully mixed to provide the DOP sol which was then measured for initial viscosity at 20° C. Also, its viscosity after 120° C.×7 days was measured at 20 ° C. Viscosity measurement was performed using a BH viscometer (product of Tokimec, Inc.) at 2 rpm and 20 rpm. The measurement results are shown in Table 2. A rate of viscosity increase refers to a ratio in percentage of the viscosity after 7 days to the viscosity immediately after the mixing.

sealants, if prepared using any of the surface-treated calcium carbonates of Examples 1–9 in accordance with the present invention, also exhibit high viscosity levels and satisfactory thixotropic properties.

(Viscosity Test of PPG Sol)

Each of the surface-treated calcium carbonates obtained in Examples 1–9 and Comparative Examples 1–3 was formulated into a PPG (polypropyelene glycol) sol and its viscosity was subsequently measured. 200 g of the surface-

TABLE 2

|  | Ex. 1 | Ex. 2 | Ex. 3 | Ex. 4 | Ex. 5 | Ex. 6 |
| --- | --- | --- | --- | --- | --- | --- |
| Immediately After Mixing |  |  |  |  |  |  |
| 2 rpm(Pa · s) | 3220 | 1220 | 1300 | 2990 | 3300 | 3000 |
| 20 rpm(Pa · s) | 419 | 163 | 210 | 380 | 452 | 401 |
| 2 rpm/20 rpm | 7.7 | 7.5 | 6.2 | 7.9 | 7.3 | 7.5 |
| After 7 Days |  |  |  |  |  |  |
| 2 rpm(Pa · s) | 3250 | 1300 | 1520 | 2970 | 3420 | 3100 |
| 20 rpm(Pa · s) | 420 | 175 | 253 | 380 | 475 | 419 |
| 2 rpm/20 rpm | 7.7 | 7.4 | 6.0 | 7.8 | 7.2 | 7.4 |
| Rate of Viscosity Increase |  |  |  |  |  |  |
| 2 rpm(%) | 101 | 107 | 117 | 100 | 104 | 103 |
| 20 rpm(%) | 100 | 107 | 120 | 100 | 105 | 104 |

|  | Ex. 7 | Ex. 8 | Ex. 9 | Comp. Ex. 1 | Comp. Ex. 2 | Comp. Ex. 3 |
| --- | --- | --- | --- | --- | --- | --- |
| Immediately After Mixing |  |  |  |  |  |  |
| 2 rpm(Pa · s) | 2520 | 2830 | 3100 | 910 | 400 | 72 |
| 20 rpm(Pa · s) | 327 | 382 | 408 | 125 | 58 | 15 |
| 2 rpm/20 rpm | 7.7 | 7.4 | 7.6 | 7.3 | 6.9 | 4.8 |
| After 7 Days |  |  |  |  |  |  |
| 2 rpm(Pa · s) | 2600 | 2800 | 3050 | 930 | 590 | 95 |
| 20 rpm(Pa · s) | 339 | 378 | 407 | 130 | 88 | 23 |
| 2 rpm/20 rpm | 7.7 | 7.4 | 7.5 | 7.2 | 6.7 | 4.1 |
| Rate of Viscosity Increase |  |  |  |  |  |  |
| 2 rpm(%) | 103 | 99 | 98 | 102 | 148 | 132 |
| 20 rpm(%) | 104 | 99 | 100 | 104 | 152 | 153 |

As can be clearly seen from the results shown in Table 2, the DOP sols prepared using the surface-treated calcium carbonates of Examples 1–9 in accordance with the present invention exhibit high viscosity levels and good thixotropic properties. They also exhibit good storage stability.

A DOP sol is contained in most sealants as a plasticizer and its viscosity is generally correlated to a viscosity of the sealant containing it. Accordingly, it can be argued that treated calcium carbonate and 200 g of PPG (polypropylene glycol, product name "SUMIPHEN 3086", product of Sumitomo Bayer Urethane Co., Ltd.) were fully mixed to provide the PPG sol. A viscosity of the resulting PPG sol both initially and after 7 days was measured in the same manner as described above. The measurement results are shown in Table 3.

TABLE 3

|  | Ex. 1 | Ex. 2 | Ex. 3 | Ex. 4 | Ex. 5 | Ex. 6 |
| --- | --- | --- | --- | --- | --- | --- |
| Immediately After Mixing |  |  |  |  |  |  |
| 2 rpm(Pa · s) | 4070 | 2710 | 1960 | 3780 | 4150 | 3680 |
| 20 rpm(Pa · s) | 527 | 358 | 277 | 480 | 555 | 480 |
| 2 rpm/20 rpm | 7.7 | 7.6 | 7.1 | 7.9 | 7.5 | 7.6 |
| After 7 Days |  |  |  |  |  |  |
| 2 rpm(Pa · s) | 4060 | 2750 | 2510 | 3600 | 4200 | 3700 |
| 20 rpm(Pa · s) | 528 | 362 | 349 | 460 | 568 | 492 |
| 2 rpm/20 rpm | 7.7 | 7.6 | 7.2 | 7.8 | 7.8 | 7.5 |
| Rate of Viscosity Increase |  |  |  |  |  |  |
| 2 rpm(%) | 100 | 101 | 128 | 95 | 101 | 101 |
| 20 rpm(%) | 100 | 101 | 126 | 96 | 102 | 103 |

TABLE 3-continued

|  | Ex. 7 | Ex. 8 | Ex. 9 | Comp. Ex. 1 | Comp. Ex. 2 | Comp. Ex. 3 |
|---|---|---|---|---|---|---|
| Immediately After Mixing | | | | | | |
| 2 rpm(Pa · s) | 3880 | 3540 | 3780 | 910 | 380 | 40 |
| 20 rpm(Pa · s) | 504 | 448 | 480 | 125 | 63 | 13 |
| 2 rpm/20 rpm | 7.7 | 7.9 | 7.9 | 7.3 | 6.0 | 3.1 |
| After 7 Days | | | | | | |
| 2 rpm(Pa · s) | 3990 | 3500 | 3600 | 920 | 510 | 63 |
| 20 rpm(Pa · s) | 518 | 449 | 460 | 126 | 89 | 21 |
| 2 rpm/20 rpm | 7.7 | 7.8 | 7.8 | 7.3 | 5.7 | 3.0 |
| Rate of Viscosity Increase | | | | | | |
| 2 rpm(%) | 103 | 99 | 95 | 101 | 134 | 158 |
| 20 rpm(%) | 103 | 100 | 96 | 101 | 141 | 162 |

As can be clearly seen from Table 3, the PPG sols prepared using the surface-treated calcium carbonates of Examples 1–9 in accordance with the present invention exhibit high viscosity levels and good thixotropic properties. They also exhibit good storage stability.

A two-part polyurethane sealant generally uses a PPG sol as a curing agent and its viscosity is well correlated to a viscosity of the PPG sol. Accordingly, it can be argued that two-part polyurethane sealants, if prepared using any of the surface-treated calcium carbonates of Examples 1–9 in accordance with the present invention, also exhibit high viscosity levels and good thixotropic properties.

(Viscosity Test of One-part Modified Silicone Sealant)

Each of the surface-treated calcium carbonates obtained in Examples 1–9 and Comparative Examples 1–3 was formulated into a one-part modified silicone sealant and its viscosity was subsequently measured. 85 g of Hakuenka CCR (product of Shiraishi Kogyo Co., Ltd.), 100 g of a modified silicone polymer (product name "MS POLYMER S203", product of Kaneka Corp.), 50 g of DOP, 35 g of heavy calcium carbonate (product name "WHITON 305", product of Shiraishi Kogyo Co., Ltd.), 15 g of the surface-treated calcium carbonate, 3.4 g of trimethoxy-vinylsilane (product name "KBM #1003", product of Shin-Etsu chemical Co., Ltd.) and 2.5 g of a catalyst (product name "#918", product of Sankyo Organic Chemicals Co., Ltd.) were fully mixed to prepare the one-part modified silicone sealant. A viscosity of the resulting one-part modified silicone sealant both initially and after 7 days was measured in the same manner as described above. The measurement results are shown in Table 4.

TABLE 4

|  | Ex. 1 | Ex. 2 | Ex. 3 | Ex. 4 | Ex. 5 | Ex. 6 |
|---|---|---|---|---|---|---|
| Immediately After Mixing | | | | | | |
| 2 rpm(Pa · s) | 1008 | 778 | 802 | 980 | 1100 | 1060 |
| 20 rpm(Pa · s) | 173 | 139 | 164 | 166 | 185 | 183 |
| 2 rpm/20 rpm | 5.8 | 5.6 | 4.9 | 5.9 | 5.9 | 5.8 |
| After 7 Days | | | | | | |
| 2 rpm(Pa · s) | 1180 | 900 | 1002 | 1117 | 1265 | 1230 |
| 20 rpm(Pa · s) | 219 | 179 | 213 | 208 | 224 | 227 |
| 2 rpm/20 rpm | 5.4 | 5.0 | 4.7 | 5.4 | 5.6 | 5.4 |
| Rate of Viscosity Increase | | | | | | |
| 2 rpm(%) | 117 | 117 | 125 | 114 | 115 | 116 |
| 20 rpm(%) | 127 | 129 | 130 | 125 | 121 | 124 |
|  | Ex. 7 | Ex. 8 | Ex. 9 | Comp. Ex. 1 | Comp. Ex. 2 | Comp. Ex. 3 |
| Immediately After Mixing | | | | | | |
| 2 rpm(Pa · s) | 990 | 1200 | 1150 | 580 | 172 | 890 |
| 20 rpm(Pa · s) | 166 | 218 | 209 | 102 | 49 | 231 |
| 2 rpm/20 rpm | 6.0 | 5.5 | 5.5 | 5.8 | 3.5 | 3.9 |
| After 7 Days | | | | | | |
| 2 rpm(Pa · s) | 1099 | 1380 | 1357 | 673 | 230 | 1068 |
| 20 rpm(Pa · s) | 199 | 266 | 270 | 128 | 68 | 291 |
| 2 rpm/20 rpm | 6.3 | 5.2 | 5.0 | 5.3 | 3.4 | 3.7 |
| Rate of Viscosity Increase | | | | | | |
| 2 rpm(%) | 111 | 115 | 118 | 116 | 134 | 120 |
| 20 rpm(%) | 120 | 122 | 129 | 125 | 138 | 126 |

As can be clearly seen from Table 4, the one-part modified silicone sealants prepared using the surface-treated calcium carbonates of Examples 1–9 in accordance with the present invention exhibit high viscosity levels and good thixotropic properties. They also exhibit good storage stability.

(Viscosity Test of Two-part Modified Silicone Sealant)

Each of the surface-treated calcium carbonates obtained in Examples 1–9 and Comparative Examples 1–3 was formulated into a two-part modified silicone sealant and its viscosity was subsequently measured. The two-part modified silicone sealant consisted of a base material and a curing agent. Used as the base material was a mixture containing 120 g of Hakuenka CCR (product of Shiraishi Kogyo Co., Ltd.), 35 g of a modified silicone polymer (product name "MS POLYMER S203", product of Kaneka Corp.), 50 g of DOP, 20 g of heavy calcium carbonate (product name "WHITON P-30", product of Shiraishi Kogyo Co., Ltd.), 15 g of the surface-treated calcium carbonate and 5 g of EPICOAT 828 (product of Yuka-Shell Epoxy Co., Ltd.). Used as the curing agent was a mixture containing 20 g of heavy calcium carbonate (product name "WHITON P-30", product of Shiraishi Kogyo Co., Ltd.), 6.3 g of DOP, 3 g of tin octylate (product) and 0.7 g of laurylamine. Each of the base material and curing agent was fully mixed. A viscosity of the resulting base material both initially and after 7 days was measured and further a viscosity of the two-part modified silicone sealant immediately after the base material and curing agent were mixed together was measured in the same manner as described above. In this particular evaluation, a viscosity value was measured by a BH viscometer at 1 rpm and 10 rpm. The measurement results are shown in Table 5.

As can be clearly seen from Table 5, the two-part modified silicone sealants and their base materials prepared using the surface-treated calcium carbonates of Examples 1–9 in accordance with the present invention exhibit high viscosity levels and good thixotropic properties. They also exhibit good storage stability.

(Viscosity Test of Silicone Sol)

Each of the surface-treated calcium carbonates obtained in Examples 1–9 and Comparative Examples 1–3 was formulated into a silicone sol and its viscosity was subsequently measured. 200 g of the surface-treated calcium carbonate and 200 g of a silicone oil (product name "TSF 451–1M", product of GE Toshiba Silicones Co., Ltd.) were fully mixed to prepare the silicone sol. A viscosity of the resulting silicone sol both initially and after 7 days was measured in the same manner as described above. The measurement results are shown in Table 6.

TABLE 5

|  | Ex. 1 | Ex. 2 | Ex. 3 | Ex. 4 | Ex. 5 | Ex. 6 |
|---|---|---|---|---|---|---|
| Base Material Viscosity (Immediately After Mixing) | | | | | | |
| 1 rpm(Pa · s) | 1820 | 1610 | 1790 | 1780 | 1850 | 1830 |
| 10 rpm(Pa · s) | 323 | 288 | 326 | 312 | 328 | 330 |
| 1 rpm/10 rpm | 5.6 | 5.6 | 5.5 | 5.7 | 5.7 | 5.5 |
| Sealant Viscosity (Immediately After Mixing) | | | | | | |
| 1 rpm(Pa · s) | 1850 | 1580 | 1810 | 1790 | 1820 | 1840 |
| 10 rpm(Pa · s) | 292 | 287 | 335 | 314 | 327 | 333 |
| 1 rpm/10 rpm | 5.5 | 5.5 | 5.4 | 5.7 | 5.6 | 5.5 |

|  | Ex. 7 | Ex. 8 | Ex. 9 | Comp. Ex. 1 | Comp. Ex. 2 | Comp. Ex. 3 |
|---|---|---|---|---|---|---|
| Immediately After Mixing | | | | | | |
| 1 rpm(Pa · s) | 1780 | 1880 | 1770 | 1510 | 1330 | 1340 |
| 10 rpm(Pa · s) | 320 | 342 | 318 | 274 | 238 | 280 |
| 1 rpm/10 rpm | 5.6 | 5.5 | 5.6 | 5.5 | 5.6 | 4.8 |
| Sealant Viscosity (Immediately After Mixing) | | | | | | |
| 1 rpm(Pa · s) | 1800 | 1900 | 1800 | 1560 | 1210 | 1350 |
| 10 rpm(Pa · s) | 328 | 349 | 318 | 280 | 220 | 296 |
| 1 rpm/10 rpm | 5.5 | 5.4 | 5.7 | 5.6 | 5.5 | 4.6 |

TABLE 6

|  | Ex. 1 | Ex. 2 | Ex. 3 | Ex. 4 | Ex. 5 | Ex. 6 |
|---|---|---|---|---|---|---|
| Immediately After Mixing | | | | | | |
| 2 rpm(Pa · s) | 410 | 350 | 405 | 380 | 390 | 400 |
| 20 rpm(Pa · s) | 87 | 78 | 88 | 79 | 83 | 83 |

TABLE 6-continued

|  |  |  |  |  |  |  |
|---|---|---|---|---|---|---|
| 2 rpm/20 rpm After 7 Days | 4.7 | 4.5 | 4.6 | 4.8 | 4.7 | 4.8 |
| 2 rpm(Pa · s) | 420 | 370 | 410 | 400 | 400 | 410 |
| 20 rpm(Pa · s) | 90 | 81 | 90 | 85 | 86 | 89 |
| 2 rpm/20 rpm Rate of Viscosity Increase | 4.7 | 4.6 | 4.6 | 4.7 | 4.7 | 4.6 |
| 2 rpm(%) | 102 | 106 | 101 | 105 | 103 | 103 |
| 20 rpm(%) | 103 | 104 | 102 | 108 | 106 | 107 |

|  | Ex. 7 | Ex. 8 | Ex. 9 | Comp. Ex. 1 | Comp. Ex. 2 | Comp. Ex. 3 |
|---|---|---|---|---|---|---|
| Immediately After Mixing |  |  |  |  |  |  |
| 2 rpm(Pa · s) | 400 | 420 | 410 | 210 | 130 | 280 |
| 20 rpm(Pa · s) | 85 | 92 | 90 | 47 | 30 | 70 |
| 2 rpm/20 rpm After 7 Days | 4.7 | 4.6 | 4.6 | 4.5 | 4.3 | 4.0 |
| 2 rpm(Pa · s) | 410 | 420 | 420 | 220 | 190 | 310 |
| 20 rpm(Pa · s) | 88 | 95 | 91 | 51 | 42 | 76 |
| 2 rpm/20 rpm Rate of Viscosity Increase | 6.3 | 4.4 | 4.6 | 4.3 | 4.7 | 4.1 |
| 2 rpm(%) | 103 | 100 | 102 | 105 | 146 | 110 |
| 20 rpm(%) | 104 | 103 | 101 | 109 | 140 | 109 |

As can be clearly seen from Table 6, the silicone sols prepared using the surface-treated calcium carbonates of Examples 1–9 in accordance with the present invention exhibit increased viscosity levels and improved thixotropic properties, compared to the silicone sols prepared using the surface-treated calcium carbonates of Comparative Examples 1–3. As also can be seen, they also exhibit superior storage stability.

Generally, a silicone sealant is well correlated in viscosity to the silicone sol. Accordingly, it can be argued that silicone sealants, if prepared using any of the surface-treated calcium carbonates of Examples 1–9 in accordance with the present invention, also exhibit high viscosity levels and good thixotropic properties.

(Viscosity Test of Polyvinyl Chloride Sol)

Each of the surface-treated calcium carbonates obtained in Examples 1–9 and Comparative Examples 1–3 was formulated into a polyvinyl chloride sol and its viscosity was subsequently measured. 200 g of the surface-treated calcium carbonate, 300 g of a polyvinyl chloride resin (product name "ZEST P21", product of Shin Daiichi Vinyl Chloride Co.), 300 g of DINP, 150 g of heavy calcium carbonate (product name "WHITON P-30", product of Shiraishi Kogyo Co., Ltd.), 10 g of a tackifier (product name "BARSAMIDE 140", product of Henkel Japan Ltd.) and 40 g of a diluent (product name "MINERAL TURPEN", product of Yamakei Sangyo Co., LTd.) were fully mixed to prepare the polyvinyl chloride sol. A viscosity of the resulting polyvinyl chloride sol both initially and after 7 days was measured in the same manner as described above. The measurement results are shown in Table 7.

TABLE 7

|  | Ex. 1 | Ex. 2 | Ex. 3 | Ex. 4 | Ex. 5 | Ex. 6 |
|---|---|---|---|---|---|---|
| Immediately After Mixing |  |  |  |  |  |  |
| 2 rpm(Pa · s) | 1040 | 740 | 750 | 1000 | 1200 | 1160 |
| 20 rpm(Pa · s) | 169 | 116 | 146 | 156 | 198 | 190 |
| 2 rpm/20 rpm After 7 Days | 6.2 | 6.4 | 5.1 | 6.4 | 6.1 | 6.1 |
| 2 rpm(Pa · s) | 1050 | 760 | 930 | 980 | 1310 | 1210 |
| 20 rpm(Pa · s) | 168 | 118 | 169 | 153 | 218 | 198 |
| 2 rpm/20 rpm Rate of Viscosity Increase | 6.3 | 6.4 | 5.5 | 6.4 | 6.0 | 6.1 |
| 2 rpm(%) | 101 | 103 | 124 | 98 | 109 | 104 |
| 20 rpm(%) | 99 | 102 | 116 | 98 | 110 | 104 |

|  | Ex. 7 | Ex. 8 | Ex. 9 | Comp. Ex. 1 | Comp. Ex. 2 | Comp. Ex. 3 |
|---|---|---|---|---|---|---|
| Immediately After Mixing |  |  |  |  |  |  |
| 2 rpm(Pa · s) | 980 | 990 | 1050 | 570 | 150 | 6.2 |
| 20 rpm(Pa · s) | 153 | 155 | 169 | 87 | 30 | 3.7 |

TABLE 7-continued

|  |  |  |  |  |  |  |
|---|---|---|---|---|---|---|
| 2 rpm/20 rpm After 7 Days | 6.4 | 6.4 | 6.2 | 6.6 | 5.0 | 1.7 |
| 2 rpm(Pa · s) | 990 | 1010 | 1010 | 554 | 260 | 8.4 |
| 20 rpm(Pa · s) | 157 | 158 | 163 | 87 | 55 | 4.8 |
| 2 rpm/20 rpm Rate of Viscosity Increase | 6.3 | 6.4 | 6.2 | 6.4 | 4.7 | 1.8 |
| 2 rpm(%) | 99 | 102 | 96 | 97 | 173 | 135 |
| 20 rpm(%) | 103 | 102 | 96 | 100 | 183 | 130 |

As can be clearly seen from Table 7, the polyvinyl chloride sols prepared using the surface-treated calcium carbonates of Examples 1–9 in accordance with the present invention exhibit high viscosity levels and good thixotropic properties. They also exhibit good storage stability.

(Viscosity Test of Acrylic Sol)

Each of the surface-treated calcium carbonates obtained in Examples 1–9 and Comparative Examples 1–3 was formulated into an acrylic sol and its viscosity was subsequently measured. 150 g of the surface-treated calcium carbonate, 300 g of an acrylic resin, 300 g of DINP, 100 g of heavy calcium carbonate (product name "WHITON P-30", product of Shiraishi Kogyo Co., Ltd.), 50 g of a diluent (product name "MINERAL TURPEN", product of Yamakei Sangyo Co., LTd.), 100 g of a tackifier (product name "BARSAMIDE 140", product of Henkel Japan Ltd.) and 2.5 g of an isocyanate resin were fully mixed to prepare the acrylic sol. A viscosity of the resulting acrylic sol both initially and after 7 days was measured in the same manner as described above. The measurement results are shown in Table 8.

As can be clearly seen from Table 8, the acrylic sols prepared using the surface-treated calcium carbonates of Examples 1–9 in accordance with the present invention exhibit high viscosity levels and good thixotropic properties. They also exhibit good storage stability.

UTILITY IN INDUSTRY

The surface-treated calcium carbonate of the present invention is a material for imparting thixotropy which, when loaded in a polymeric material such as an ink, paint, sealing medium, PVC sol or acrylic sol, can impart high viscosity and satisfactory thixotropic properties thereto. It shows little viscosity change with time and thus has superior storage stability.

Because the material for imparting thixotropy comprises calcium carbonate, it can be produced at a relative low price and thus has an economical benefit.

The paste resin composition of the present invention can be formulated into a polyurethane sealant, modified silicone sealant, silicone sealant, polysulfide sealant, polyvinyl chlo-

TABLE 8

|  | Ex. 1 | Ex. 2 | Ex. 3 | Ex. 4 | Ex. 5 | Ex. 6 |
|---|---|---|---|---|---|---|
| Immediately After Mixing |  |  |  |  |  |  |
| 2 rpm(Pa · s) | 870 | 790 | 850 | 900 | 890 | 850 |
| 20 rpm(Pa · s) | 143 | 132 | 144 | 145 | 148 | 140 |
| 2 rpm/20 rpm After 1 Day | 6.1 | 6.0 | 5.9 | 6.2 | 6.0 | 6.1 |
| 2 rpm(Pa · s) | 880 | 830 | 860 | 910 | 900 | 870 |
| 20 rpm(Pa · s) | 145 | 141 | 150 | 148 | 151 | 146 |
| 2 rpm/20 rpm Rate of Viscosity Increase | 6.1 | 5.9 | 5.7 | 6.2 | 6.0 | 6.0 |
| 2 rpm(%) | 101 | 105 | 101 | 101 | 109 | 102 |
| 20 rpm(%) | 101 | 107 | 104 | 102 | 110 | 104 |
|  | Ex. 7 | Ex. 8 | Ex. 9 | Comp. Ex. 1 | Comp. Ex. 2 | Comp. Ex. 3 |
| Immediately After Mixing |  |  |  |  |  |  |
| 2 rpm(Pa · s) | 910 | 900 | 880 | 430 | 380 | 450 |
| 20 rpm(Pa · s) | 143 | 144 | 146 | 87 | 93 | 103 |
| 2 rpm/20 rpm After 1 Day | 6.4 | 6.3 | 6.0 | 4.9 | 4.1 | 4.3 |
| 2 rpm(Pa · s) | 910 | 920 | 910 | 504 | 450 | 510 |
| 20 rpm(Pa · s) | 146 | 150 | 153 | 100 | 120 | 118 |
| 2 rpm/20 rpm Rate of Viscosity Increase | 6.2 | 6.1 | 5.9 | 5.0 | 3.8 | 4.3 |
| 2 rpm(%) | 100 | 102 | 103 | 117 | 118 | 113 |
| 20 rpm(%) | 102 | 104 | 105 | 115 | 129 | 109 | ride sol, acrylic sol or the like, and has high viscosity and satisfactory thixotropic properties. Also, it shows little viscosity change with time and thus has superior storage stability.

The invention claimed is:

1. A material for imparting thixotropy comprising surface-treated calcium carbonate which results from surface treatment of calcium carbonate having a BET specific surface area of 10–100 m$^2$/g with an unsaturated fatty acid (A) and a saturated fatty acid (B), characterized in that said material for imparting thixotropy exhibits a modal pore size peak at below 0.03 μm and a modal pore volume of 0.05–0.5 cm$^3$/g on a pore size distribution curve derived from mercury porosimetry, and the (A)/(B) blending ratio of said unsaturated fatty acid (A) and saturated fatty acid (B) is 0.5–1.9.

2. The material for imparting thixotropy as recited in claim 1, characterized in that said unsaturated fatty acid (A) and saturated fatty acid (B) are used in their metal salt or ester forms to effect the surface treatment.

3. The material for imparting thixotropy as recited in claim 1, characterized in that said unsaturated fatty acid (A) and saturated fatty acid (B) have a carbon number of 6–31, respectively.

4. A paste resin composition containing surface-treated calcium carbonate which results from surface treatment of calcium carbonate having a BET specific surface area of 10–100 m$^2$/g with an unsaturated fatty acid (A) and a saturated fatty acid (B), characterized in that said surface-treated calcium carbonate exhibits a modal pore size peak at below 0.03 μm and a modal pore volume of 0.05–0.5 cm$^3$/g on a pore size distribution curve derived from mercury porosimetry, and the (A)/(B) blending ratio of said unsaturated fatty acid (A) and saturated fatty acid (B) is 0.5–1.9.

5. A paste resin composition as recited in claim 4, characterized in that said unsaturated fatty acid (A) and saturated fatty acid (B) are used in their metal salt or ester forms to effect the surface treatment.

6. A paste resin composition as recited in claim 4, characterized in that said unsaturated fatty acid (A) and saturated fatty acid (B) have a carbon number of 6–31, respectively.

7. The paste resin composition as recited in claim 4, characterized as constituting a polyurethane sealant.

8. The paste resin composition as recited in claim 4, characterized as constituting a modified silicone sealant.

9. The paste resin composition as recited in claim 4, characterized as constituting a silicone sealant.

10. The paste resin composition as recited in claim 4, characterized as constituting a polysulfide sealant.

11. The paste resin composition as recited in claim 4, characterized as constituting a polyvinyl chloride sol.

12. The paste resin composition as recited in claim 4 characterized as constituting an acrylic sol.

* * * * *